United States Patent [19]

Isabelle et al.

[11] Patent Number: 5,381,563
[45] Date of Patent: Jan. 17, 1995

[54] CHECK VALVE, AND HYDROMASSAGING APPARATUS COMPRISING AT LEAST ONE OF SUCH A CHECK VALVE

[75] Inventors: Paul Isabelle, Québec; Aldo Balatti, Saint-Augustin, both of Canada

[73] Assignee: Roger Carrier, Quebec, Canada

[21] Appl. No.: 996,569

[22] Filed: Dec. 24, 1992

[51] Int. Cl.⁶ .......................................... A61H 33/02
[52] U.S. Cl. ..................... 4/541.5; 137/859; 4/514.6
[58] Field of Search .................. 4/541.4, 541.5, 541.3, 4/541.6; 137/859

[56] References Cited

U.S. PATENT DOCUMENTS

| | | | |
|---|---|---|---|
| 2,594,318 | 4/1952 | Langdon | 137/846 X |
| 2,615,675 | 10/1952 | Mellert | 137/859 X |
| 3,159,176 | 12/1964 | Russell et al. | 137/846 X |
| 3,621,876 | 11/1971 | Campbell | 137/846 |
| 3,822,720 | 7/1974 | Souza | 137/525.1 |

(List continued on next page.)

FOREIGN PATENT DOCUMENTS

| | | | |
|---|---|---|---|
| 1073298 | 11/1980 | Canada | 128/23 |
| 129738 | 1/1985 | European Pat. Off. | |
| 209646 | 1/1987 | European Pat. Off. | |
| 312953 | 4/1989 | European Pat. Off. | |
| 0411930 | 2/1991 | European Pat. Off. | |
| 1112923 | 3/1956 | France | |
| 76865 | 11/1961 | France | |
| 3331529 | 3/1985 | Germany | 137/859 |
| 6090522 | 5/1985 | Japan | |
| 60231077 | 11/1985 | Japan | |
| 8802541 | 8/1989 | Netherlands | 4/541.4 |
| 2107180 | 4/1983 | United Kingdom | 4/541.5 |
| 2112670 | 7/1983 | United Kingdom | |
| 8910112 | 11/1989 | WIPO | |

OTHER PUBLICATIONS

Matsukuma, Abstract of Japanese Kokai 60-231077, Nov. 16, 1985, 1 page.
Three (3) searches from WPAT Database made Jan. 23, 1992 and Jan. 27, 1992.
Advertising brochure of Les Plastiques MC LTEE with translation (no date).
Search from WPAT Database made Jun. 12, 1991.

Primary Examiner—Robert M. Fetsuga
Attorney, Agent, or Firm—Michael D. Bednarek

[57] ABSTRACT

An improvement in a check valve, especially a check valve intended to be mounted across a corresponding opening of a hydromassaging apparatus. The check valve comprises a casing having an inlet and an outlet, a conduit extending from said inlet to said outlet, structure for axially setting and fastening the check valve in a corresponding opening, and improved structure including a membrane and consisting of a flexible membrane made of elastomeric material and provided with an orifice, an element provided with a flap seat of sufficient size to completely cover the orifice, structure for connecting the element with the casing and positioning the seat in the vicinity of the outlet, and structure for fastening a periphery of the membrane across the outlet of the casing, to align the orifice with the seat and to position said orifice in such a way with respect to the seat that the elasticity of the membrane presses a portion thereof surrounding the orifice against the seat. When the pressure applied by the water of the tub plus the pressure resulting from the elasticity of the membrane that presses a portion of said membrane surrounding the orifice against the seat is higher or lower than the pressure of air on the opposite side of the membrane, the check valve is respectively closed or opened. The invention also relates to a hydromassaging apparatus equiped with such an improved check valve.

17 Claims, 7 Drawing Sheets

U.S. PATENT DOCUMENTS

| | | | |
|---|---|---|---|
| 3,827,456 | 8/1974 | Sheppard | 137/859 |
| 3,850,190 | 11/1974 | Carlson | 137/859 X |
| 3,901,272 | 8/1975 | Banners et al. | 137/513.5 |
| 4,077,429 | 3/1978 | Kimball | 137/846 X |
| 4,218,784 | 8/1980 | Richards . | |
| 4,249,522 | 2/1981 | Carrier | 128/66 |
| 4,284,104 | 8/1981 | Beghini | 137/859 |
| 4,340,039 | 7/1982 | Hibbard et al. | 128/66 |
| 4,510,967 | 4/1985 | Spinnett | 137/389 |
| 4,512,934 | 4/1985 | Bucher | 261/64 B |
| 4,525,881 | 7/1985 | Higginbotham | 4/496 |
| 4,535,818 | 8/1985 | Duncan et al. | 137/846 |
| 4,535,819 | 8/1985 | Atkinson et al. | 1376/846 |
| 4,537,358 | 8/1985 | Anderson | 239/413 |
| 4,541,780 | 9/1985 | Moreland | 417/176 |
| 4,566,493 | 1/1986 | Edwards et al. | 137/846 |
| 4,577,353 | 3/1986 | Viegener | 4/541.1 |
| 4,592,100 | 6/1986 | Robertson et al. | 4/541.5 X |
| 4,593,420 | 6/1986 | Tobias et al. | 4/496 |
| 4,612,960 | 9/1986 | Edwards et al. | 137/846 |
| 4,671,463 | 6/1987 | Moreland et al. | 239/428.5 |
| 4,785,484 | 11/1988 | Sargent . | |
| 4,901,379 | 2/1990 | Chalberg et al. | 4/514.5 X |
| 4,972,531 | 11/1990 | Gravatt | 4/514.6 |
| 4,982,459 | 1/1991 | Henkin et al. | 4/541.6 X |

CHECK VALVE, AND HYDROMASSAGING APPARATUS COMPRISING AT LEAST ONE OF SUCH A CHECK VALVE

BACKGROUND OF THE INVENTION 1.(a) Field of the Invention

The present invention relates to an improvement in check valve in general and preferably in check valve of the type used in massaging or hydromassaging apparatuses (especially therapeutic baths). Those apparatuses or baths are of the type provided with a plurality of openings positioned below a level of water, and provided with a check valve mounted across each of said openings. The invention also relates to massaging or hydromassaging apparatuses (or therapeutic baths) in which each check valve is the aforesaid improved check valve.

1.(b) Brief Description of the Prior Art

As disclosed in U.S. Pat. No. 4,249,522, there exists a hydromassaging apparatus comprising in combination a tub, compressed air supply means located adjacent the tub, longitudinally extending air distribution duct means secured to the outside surface of the tub, the duct means also comprising air distribution branches and a plurality of small openings extending through the tub from the air distribution duct means, the openings being evenly spaced apart.

In Applicant's Canadian patent applications Nos. 2,005,276-7 and 2,018,117-6, there is disclosed a check valve which is intended to be positioned across a corresponding opening (especially a side opening) of a hydromassaging apparatus (advantageously a therapeutic bath of the type described in U.S. Pat. No. 4,249,522) in order, when a check valve is mounted across each opening of the apparatus, to prevent any introduction of water contained in the tub of the apparatus toward duct means of said apparatus. Such a check valve is efficient to keep dry said duct means and thus minimize the risk of having a growth of bacteria and/or fungi in said duct means. However, because each check valve is provided with at least one recess, at its end in contact with the water contained in the tub, it was noted that when the tub is emptied, some water, especially waste water, remained in aforesaid recess, especially when the check valve is mounted across an opening provided in the bottom of the tub. Also, because a check valve is relatively small, it is almost impossible to easily clean said recess after each use of the apparatus. Thus, bacteria and/or fungi may be allowed to grow in said recess. Such a drawback negatively affect the sanitariness of the apparatus using such a check valve.

The published PCT patent application No. W089/10112 discloses an air excitation hydromassage bath system designed for use in an ordinary bathtub. The system utilizes an air control array of adjustable nozzle assemblies installed on the bottom of the tub. The air control system includes two or more arrays of adjustable nozzle assemblies. Each nozzle assembly is provided with a cap, a body and a foot as well as an additional check valve located between the cap and the body. The cap and the body are configured to permit adjustability of air flow from substantially off to substantially full flow and also provide means for directing air flow laterally and/or vertically.

The additional check valve disclosed in this PCT application is a conical shaped membrane having a large periphery which makes possible the risk, in presence of dirt, oil and/or soap deposits, to stick to the body. Also, because there is a volume between the cap and the membrane, water (especially waste water) may remain in that volume which cannot be cleaned, and there is a substantial risk of having a growth of bacteria and/or fungi therein. Furthermore, it is compulsory, with this check valve, to have a cap in order to create jets of air bubbles in water and prevent the membrane to be damaged or rendered non-operable (especially when the check valve is positioned in the bottom of the tub) because someone could walk thereon.

SUMMARY OF THE INVENTION

A first object of the present invention relates to an improved check valve which overcomes aforesaid drawbacks. Advantageously, the invention relates to a check valve which:

- has its part in contact with the water, that is very easy to clean and substantially free of recesses in which accumulation of water could occur and thus allows a growth of bacteria and/or fungi therein,
- is us able without any diffusion cover intended to protect the membrane and create a jet of air bubbles,
- has a membrane which do not tend to stick on the casing, in presence of soap and/or other deposits, because it has an orifice of relatively small periphery where soap and/or other deposits may accumulate.

A further object of the present invention relates to an improved check valve comprising a membrane that is shaped in such a way that when the check valve is closed, it is pressed (i.e. preloaded) against a corresponding seat, and when the check valve is opened, it is lifted above the seat by snap action resulting from the action of the air in association with an inversion of curvature of the membrane. In fact, the orifice of the membrane will be raised at a greater distance from the flap seat with a lesser air pressure.

More particularly, the invention relates to an improvement in a check valve comprising a casing having opposite ends and being provided with a longitudinal axis, at least one longitudinal outer surface, an inlet at one end of said casing, an outlet at the opposite end of said casing, a conduit extending from said inlet to said outlet and means including a membrane and being adapted to react to a differential of pressure existing between opposite faces of said membrane and move it either to an opened position or closed position. The opened position allows a fluid communication from the inlet to the outlet. The closed position prevents any fluid communication from the outlet to the inlet. The casing is further provided with means adapted for axially setting and fastening it as any conventional check valve.

The improvement to the aforesaid check valve comprises as means including a membrane,

- a flexible membrane made of elastomeric material, provided with an orifice, said membrane having an inner face and an outer face;
- an element provided with a seat of sufficient size to completely cover the orifice;
- means for connecting the element with the casing and positioning the seat in the vicinity of the outlet of the casing;
- means for fastening the periphery of the membrane on the casing, to position the membrane across the outlet of the casing, to align the orifice with the seat and to position said orifice in such a way with respect to the seat that the elasticity of the membrane presses a portion thereof surrounding the orifice against the seat, and with the proviso that:

when the pressure applied by a first fluid on the outer face of the membrane plus the pressure resulting from the elasticity of the membrane that presses the portion of membrane surrounding the orifice against the seat, is higher than the pressure applied by a second fluid on the inner face of said membrane, then said portion of membrane surrounding the orifice is pressed against the seat (check valve closed) to prevent any fluid communication from the outlet to the inlet of the casing;

when the pressure applied by the air on the inner face of the membrane is higher than the pressure applied by the water against the outer face of the membrane plus the pressure resulting from the elasticity of the membrane that presses the portion of membrane surrounding the orifice against the seat, then the membrane is disformed and the portion thereof surrounding the orifice is moved away from the seat (check valve open) to allow a fluid communication from the inlet to the outlet of the casing.

Preferably, the membrane is shaped to have, initially, a spherical radius of curvature and to allow, when fastened on the casing, an elasticity of the membrane to press a portion thereof surrounding the orifice, against the seat, and with the proviso that:

when the pressure applied by the first fluid on the outer face of the membrane plus the pressure resulting from the elasticity of the membrane that presses the portion of membrane surrounding the orifice against the seat, is higher than the pressure applied by the second fluid on the inner face of said membrane, then said portion of membrane surrounding the orifice is moved toward, by snap action, when the orifice is away from the seat, and pressed against the seat (check valve closed) to prevent any fluid communication from the outlet to the inlet of the casing;

when the pressure applied by the second fluid on the inner face of the membrane is higher than the pressure applied by the first fluid against the outer face of the membrane plus the pressure resulting from the elasticity of the membrane that presses the portion of membrane surrounding the orifice against the seat, then that portion of membrane is disformed and moved away from the seat and because the shape and elasticity of the membrane, the radius of curvature of the membrane is inversed by the pressure of air and the orifice is moved by snap action at a substantially distance from the seat.

Advantageously, aforesaid improved check valves are preferably intended to be mounted across a corresponding opening of a hydromassaging apparatus of the type comprising:

a tub having a bottom wall and side walls and being intended to be filled with water to a determined level, at least one of said walls being provided with openings below said determined level of water;

generation means adapted to generate a flow of pressurized air; and duct means positioned in fluid communication between said openings and generation means adapted to generate a flow of pressurized air so that said flow can circulate from said generation means through said duct means and openings and then bubble in water.

In that particularly preferred use of a check valve according to the invention, the inlet is intended to be put in fluid communication with the duct means, the outlet is intended to be put in fluid communication with an interior of said tub. Of course, the casing is further provided with means adapted for axially setting and fastening said check valve to seal a corresponding opening of the tub.

According to the aforesaid preferred use:

when the pressure applied by the water of the tub on the outer face of the membrane plus the pressure resulting from the elasticity of the membrane that presses the portion of membrane surrounding the orifice against the seat, is higher than the pressure applied by the air on the inner face of said membrane, then said portion of membrane surrounding the orifice is pressed against the seat (check valve closed) to prevent any fluid communication from the tub to the duct means;

when the pressure applied by the air on the inner face of the membrane is higher than the pressure applied by the water against the outer face of the membrane plus the pressure resulting from the elasticity of the membrane that presses the portion of membrane surrounding the orifice against the seat, then the membrane is disformed and the portion thereof surrounding the orifice is moved away from the seat (check valve open) to allow a fluid communication from the duct means to the tub and thus allow the pressurized air to jet into the water.

Preferably, when, according to the aforesaid preferred use, the membrane is shaped to have, initially, a spherical radius of curvature and to allow, when fastened on the casing, an elasticity of the membrane to press a portion thereof surrounding the orifice, against the seat, then:

when the pressure applied by the water of the tub on the outer face of the membrane plus the pressure resulting from the elasticity of the membrane that presses the portion of membrane surrounding the orifice against the seat, is higher than the pressure applied by the air on the inner face of said membrane, then said portion of membrane surrounding the orifice is moved toward, by snap action, when the orifice is away from the seat, and pressed against the seat (check valve closed) to prevent any fluid communication from the tub to the duct means;

when the pressure applied by the air on the inner face of the membrane is higher than the pressure applied by the water against the outer face of the membrane plus the pressure resulting from the elasticity of the membrane that presses the portion of membrane surrounding the orifice against the seat, then that portion of membrane is disformed and moved away from the seat and because the shape and elasticity of the membrane, the radius of curvature of the membrane is inversed by the pressure of air and the orifice is moved, by snap action, at a substantially distance from the seat.

Advantageously, the elasticity of the membrane is selected in such a way that even when the portion of membrane surrounding the orifice is pressed against the seat, the pressure on the inner face of the membrane is still greater than the pressure on the outer face of the membrane. This allows to ensure a tight check valve. Indeed, if the check valve was open, the fluid exerting a pressure on the inner face of the membrane would be streaming out and the fluid exerting a pressure on the outer face of the membrane could not enter.

Another object of the present invention relates to a massaging or hydromassaging apparatus (especially a therapeutic bath) in which each opening is provided with a corresponding check valve as defined hereinbefore.

BRIEF DESCRIPTION OF DRAWINGS

The present invention will be better understood with reference to the following non-restrictive description of preferred embodiments thereof, taken in connection with the accompanying drawings in which.

DESCRIPTION OF PREFERRED EMBODIMENTS

The check valve "CV" is intended to be mounted across a corresponding opening 9 of a hydromassaging apparatus HA, especially a therapeutic bath.

Figure 1:
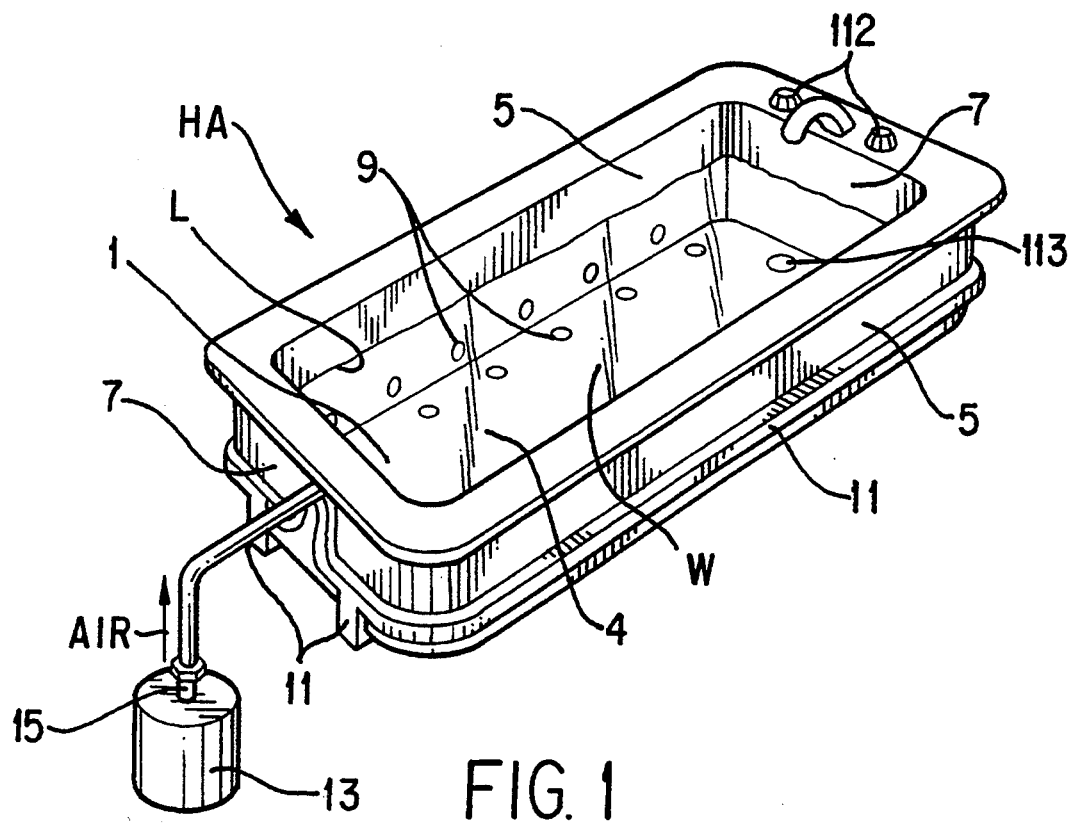
FIG. 1 is a perspective view of a hydromassaging apparatus in which an improvement according to the invention is to be provided.
Figure 2:
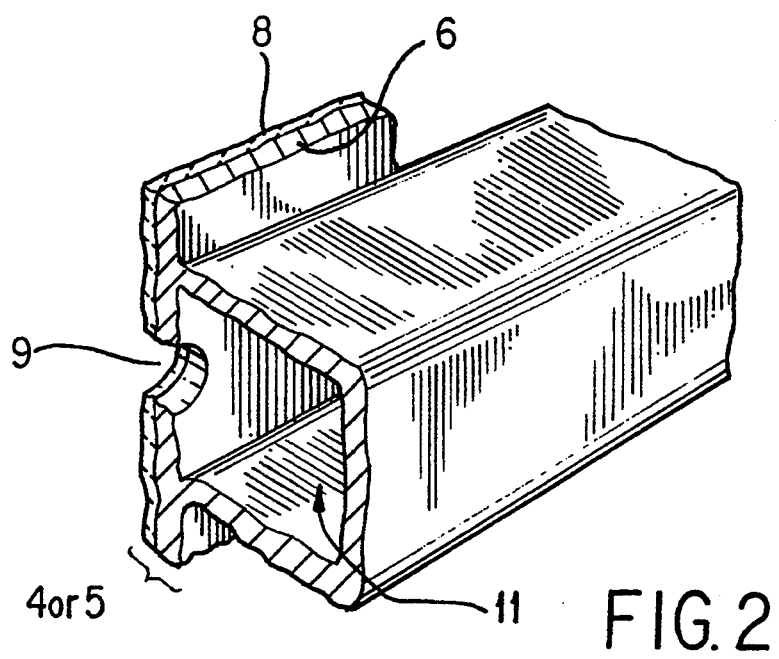
FIG. 2 is a partial and perspective cross sectional view of a wall of the apparatus of FIG. 1, which shows a part of one side opening or floor opening, and part of a duct.
Figure 3:
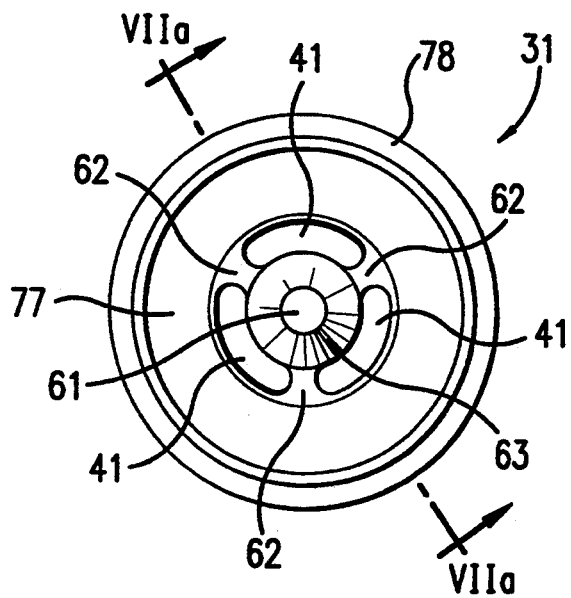
FIG. 3 is a front elevational view of a casing of a check valve according to a first preferred embodiment of the invention.
Figure 4:
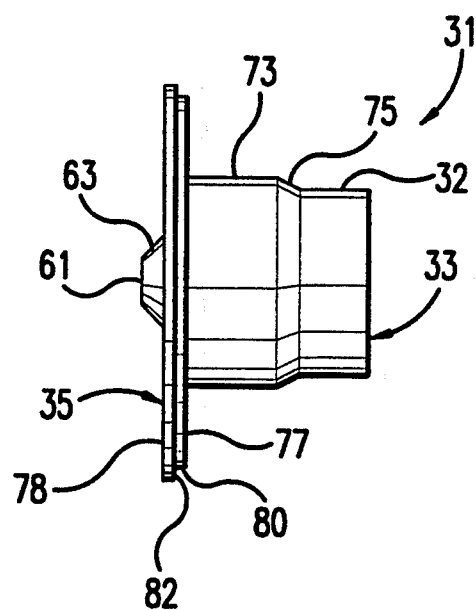
FIG. 4 is a side elevational view of the casing of FIG. 3.
Figure 5:
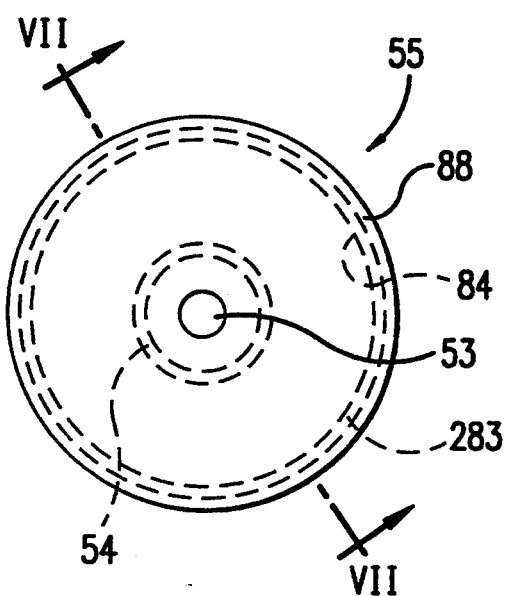
FIG. 5 is a top plan view of a membrane according to a first preferred embodiment of the invention.
Figure 6:
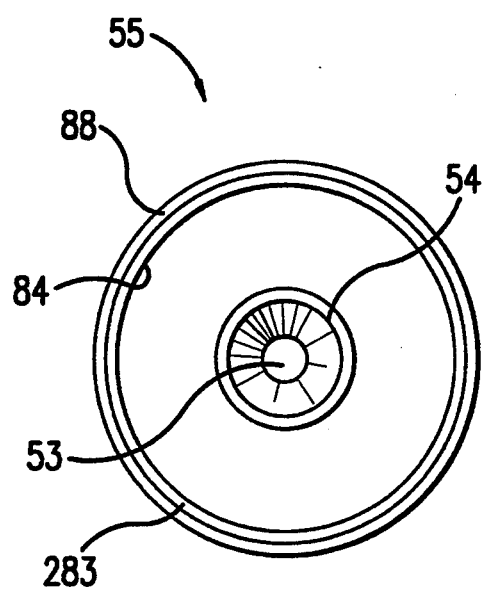
FIG. 6 is a bottom plan view of the membrane of FIG. 5.

As illustrated in FIGS. 1 and 2, the apparatus HA comprises a tub having a bottom 1, a floor wall 4 and/or opposite side walls 5, provided with a plurality of evenly spaced openings 9, opposite side walls 7, ducts 11 and means adapted to generate a flow of pressurized air, circulate it through said ducts 11 and openings 9 and then bubble it (under jet form) in water "W". In use, water "W" is at a level "L" always above openings 9. In fact, openings 9 may be positioned in wall 4 and/or walls 5 (preferably close to bottom 1), so as to maximize the distance between said openings and the level "L" and thus increase the path of bubbles across water "W" to thereby increase movement of water "W" generated by said bubbles.

More particularly, the means adapted to generate a flow of pressurized air may consist of a fan 13 operated by an electric motor and provided with an outlet 15 which is put in fluid communication with ducts 11 by any appropriate means well known to one skilled in the art. (e.g. pipe fitting, etc. . . . ).

Preferably, walls 5 and 7 consist of a sheet 6 (made of metal such as steel, plastic or fiber glass) and one layer 8 of an appropriate coating (such as enamel, acrylic, gel coal, etc). Also, ducts 11 may be made with a sheet of metal (such as steel), plastic or fiber glass. Preferably, a portion of ducts 11 is integral with sheet 6. Alternatively, ducts 11 may consist of tubes. Of course, one skilled in the art is well aware of how a therapeutic bath (such as the one of U.S. Pat. No. 4,249,522) has to be built. Therefore, it is not necessary to provide further particulars about walls 5 and 7, ducts 11, fan 13 and openings 9.

More particularly, according to a first preferred embodiment, the check valve "CV" shown in FIGS. 3 to 9 comprises a casing 31 having opposite ends, one of said ends defining an inlet 33 while the opposite end defines an outlet 35, a longitudinal axis and at least one longitudinal outer surface. The inlet 33 is intended to be put in fluid communication with a corresponding duct 11. The outlet 35 is intended to be put in fluid communication with an interior of the tub. The casing also comprises a conduit 41 extending from said inlet 33 to said outlet 35, means adapted to allow a fluid communication from the inlet 33 to the outlet 35 and prevent any fluid communication from the outlet 35 to the inlet 33 and means adapted for axially setting and fastening the check valve "CV" to seal a corresponding opening 9 of the tub.

The improvement provided in the check valve "CV" is characterized by the fact that means adapted to allow fluid communication from the inlet 33 to the outlet 35 and prevent any fluid communication from the outlet 35 to the inlet 33 comprise:

a flexible membrane 55 made of elastomeric material, provided with an orifice 53, said membrane having an inner face and an outer face;

an element 61 provided with a seat 63 of sufficient size to completely cover the orifice 53;

means for connecting the element 61 with the casing 31 and positioning the seat 63 in the vicinity of the outlet 35;

means for fastening a periphery of the membrane 55 with the casing 31 to thereby completely cover the outlet 35, align the orifice 53 with the seat 63 and position said orifice in such a way with respect to the seat 63 that the elasticity of the membrane presses a portion of the membrane surrounding the orifice 53 against the seat 63.

This improved check valve "CV" works as follows:

When the pressure applied by the water "W" contained in the tub, on the outer face of the membrane plus the pressure resulting from the elasticity of the membrane 55 that presses a portion thereof surrounding the orifice 53 against the seat 63, is higher than the pressure applied by the air on the inner face of said membrane, then said portion of membrane surrounding the orifice 53 is pressed against the seat 63 (i.e. check valve "CV" is closed) to prevent any fluid communication from the outlet 35 to the inlet 33.

When the pressure applied by the air on the inner face of the membrane 55 is higher than the pressure applied by the water "W" against the outer face of the membrane 55 plus the pressure resulting from the elasticity of the membrane 55 that presses a portion thereof surrounding the orifice 53 against the seat 63, then the membrane 55 is disformed and the portion thereof surrounding the orifice is moved away from the seat 63 (i.e. check valve is opened) to allow a fluid communication from the inlet 33 to the outlet 35 and thus allow the pressurized air to jet into the water.

According to a second preferred embodiment, as illustrated in FIGS. 10 to 17, the invention relates to a check valve "CV'" which comprises a casing 231 having opposite ends, one of the said ends defining an inlet 233 while the opposite defines an outlet 235, and a longitudinal axis and at least one longitudinal outer surface. The inlet 233 is intended to be put in fluid communication with a corresponding duct 11. The outlet 235 is intended to be put in fluid communication with an interior of the tub. The casing 231 also comprises a conduit 241 extending from said inlet 233 to said outlet 235, means adapted to allow a fluid communication from the inlet 233 to the outlet 235 and prevent any fluid communication from the outlet 235 to the inlet 233, and means adapted for axially setting and fastening the check valve "CV'" to seal a corresponding opening 9 of the tub.

The improvement provided in check valve "CV'" is characterized by the fact that means adapted to allow a fluid communication from the inlet 233 to the outlet 235 and prevent any fluid communication from the outlet 235 to the inlet 233 comprising:

a flexible membrane 255 made of elastomeric material, provided with an orifice 253, said membrane having an inner face and an outer face, and said membrane initially having, when no pressure is applied on opposite faces thereof, a spherical radius of curvature;

an element 261 provided with a seat 263 of sufficient size to completely cover the orifice 253;

means for connecting the element 261 with the casing 231 and positioning the seat 263 in the vicinity of the outlet 235 and in such a way with respect to the orifice 253 that the elasticity of the membrane presses a portion thereof surrounding said orifice 253 against the seat 263.

This preferred check valve "CV'" works as follows:

When the pressure applied by the water of the tub on the outer face of the membrane 255 plus the pressure resulting from the elasticity of the membrane 255 that presses the portion of membrane surrounding the orifice 253 against the seat 263, is higher than the pressure applied by the air on the inner face of said membrane 255, then said portion of membrane surrounding the orifice 253 is moved toward, by snap action when the orifice is away from the seat, and pressed against the seat 263 (check valve "CV'" is closed) to prevent any fluid communication from the outlet 235 to the inlet 233.

When the pressure applied by the air on the inner face of the membrane 255 is higher than the pressure applied by the water against the outer face of the membrane 255 plus the pressure resulting from the elasticity of the membrane that presses the portion of membrane surrounding the orifice 253 against the seat 263, then that portion of membrane is disformed and moved away from the seat 263 and because the shape and elasticity of the membrane, the radius of curvature of the membrane is inversed by the pressure of air and the orifice 253 is moved by snap action at a substantially distance from the seat 263.

Advantageously, the outer surface of the casing 31 (or 231) is substantially cylindrical and means for fastening the membrane 55 (or 255) across the outlet 35 (or 235) of the casing 31 (or 231), to align the orifice 53 (or 253) with the seat 63 (or 263), and to position the orifice 53 (or 253) in such a way with respect to the seat 63 (or 263) that a portion of the membrane surrounding the orifice 53 (or 253) is pressed against the seat 63 (or 263) by the elasticity of the membrane consist of:

a flange 77 (or 277) which extends from the outer surface of the casing 31 (or 231). This flange 77 (or 277) has an rim 78 (or 278) of predetermined shape and periphery. Preferably, the rim 78 (or 278) defines with the edge 80 (or 280) of the flange 77 (or 277), when the check valve CV (or CV') is mounted across a corresponding opening 9, a groove between a shoulder 82 (or 282) and the corresponding wall 4 or 5;

a skirt 84 (or 284) which extends from a periphery of the membrane 55 (or 255). This skirt 84 (or 284) is provided with an inner surface 86 (or 286) having such a shape and periphery that it matches with the periphery of the rim 78 (or 278) of the flange 77 (or 277). Preferably, the periphery of the surface 86 (or 286) is slightly smaller than the one of the edge of rim 78 (or 278);

a protuberance 88 (or 288) provided on the inner surface 86 (or 286) of the skirt 84 (or 284) and at a distance from the membrane 55 (or 255). This protuberance 88 (or 288) is of such a size and shape that the rim 78 (or 278) is positionable and preferably pinched between one face of the membrane and the protuberance 88 (or 288). Preferably, the protuberance is a rib provided with a shoulder 90 (or 290). The thickness of the rib may be slightly greater than a width of the groove defined between the shoulder 82 (or 282) and the wall 4 or 5 in order to be advantageously compressed in said groove, when the check valve CV (or CV') is mounted across the opening 9, and may have a periphery smaller than the periphery of the rim 78 (or 278) so as to have shoulder 90 (or 290) engaged against shoulder 82 (or 282). Preferably, the protuberance 88 (or 288) may be provided with a bevelled surface 83 (or 283).

The seat 63 may have a frusto-conical shape and the portion of the membrane 55 surrounding the orifice 53 is thickened to define a ring 54 and shaped to be provided with a frusto-conical sidewall 57. This sidewall 57 is shaped and sized to match with the frusto-conical seat 63. Alternatively, the seat 63 and the ring 54 may be similar to those define hereinafter for the check valve "CV'".

Preferably, the seat 263 has a hemi-spherical shape and the portion of the membrane 255 surrounding the orifice 253 is thickened to define a ring 254 and shaped to be provided with a rounded sidewall 257. This sidewall 257 is sized to engage the hemi-spherical seat 263.

Advantageously, it should be noted that the junction between periphery of the membrane 255 and the skirt 284 is shaped in such a way that the elasticity of the membrane 255 will bring the ring 254 against the seat 263 when there is no pressure applied by water or the air against opposite faces of the membrane 255. To do this, for example, a membrane 255 whose the radius of spherical curvature sets the top of the orifice 253 at 0.06 inch below the top of the periphery of the membrane 255 is mounted in such a way on the outlet of the casing 231 that when the check valve "CV'" is closed, the top of the orifice 253 rests on the seat 263 and is located at 0.03 inch below the top of the periphery of the membrane, and when the check valve "CV'" is opened, the radius of spherical curvature of the membrane "CV'" may be inversed by the pressure of air and the top of the orifice 253 is located at 0.06 inch above the top of the periphery of the membrane 255 (thus 0.09 inch above the seat 263). Of course, the pressure of air may further disform the membrane and move the orifice 253 at a greater distance from the seat 263.

Advantageously, means for connecting the element 61 (or 261) with the casing 31 (or 231) may consist of at least one connecting-member 62 (or 262) (for example from 2 to 4 and preferably 3 members 62 (or 262)) having opposite ends. One end of each member 62 (or 262) make an integral part of the conduit 41 (or 241) while the opposite end make an integral part of the element 61 (or 261). When there is more than one member 62 (or 262), they are preferably evenly distributed around the element 61 (or 261). Each element 62 (or 262) may extend along substantially the whole length of the conduit 41 (or 241).

Figure 7:
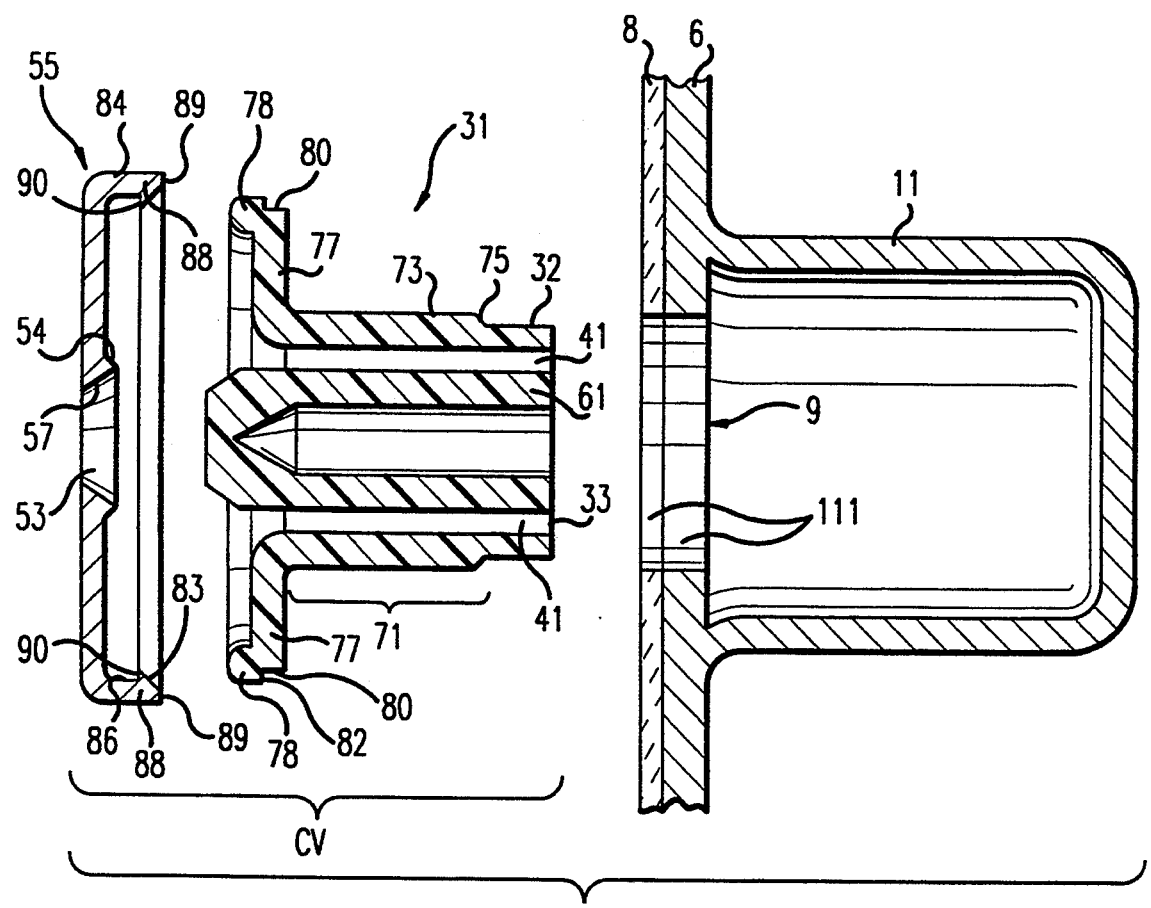
FIG. 7 is an exploded view illustrating how the membrane (which is represented as a cross sectional view according to VII—VII of FIG. 5) is fastened on the casing (which is represented as a cross sectional view according to VIIa—VIIa of FIG. 3); and how this casing is positioned across a corresponding opening of the wall of the tub (which is represented according to a cross sectional view)
Figure 8:
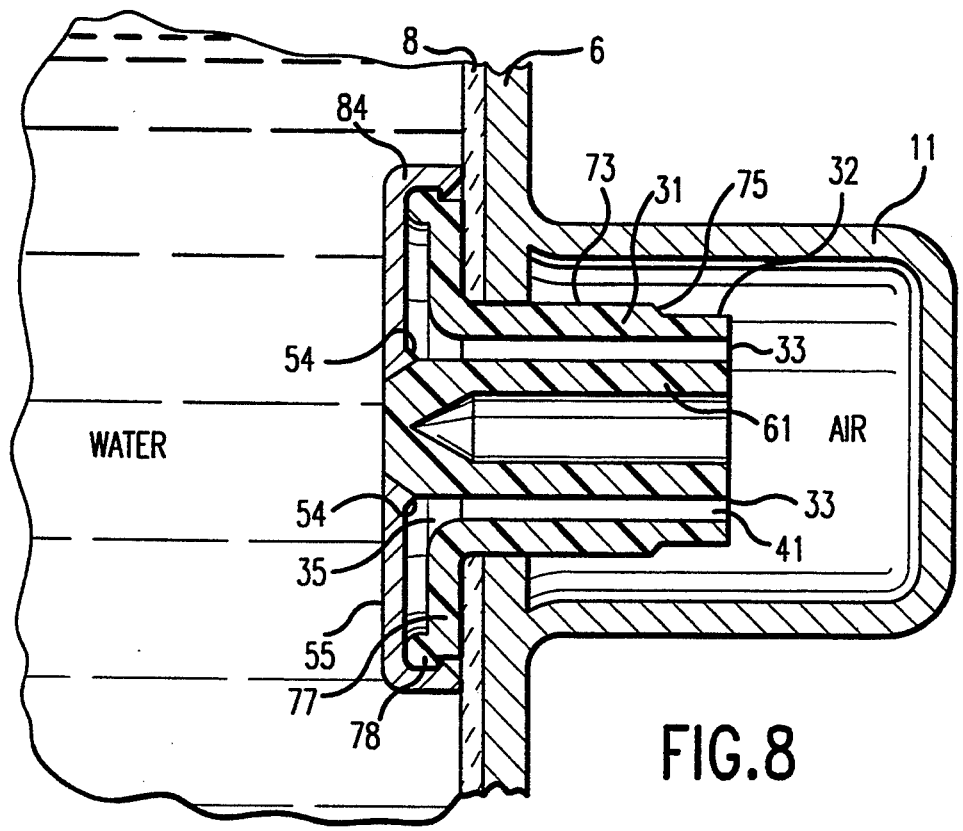
FIGS. 8 and 9 represent the check valve of FIG. 7 in a closed and an open position, respectively.
Figure 9:
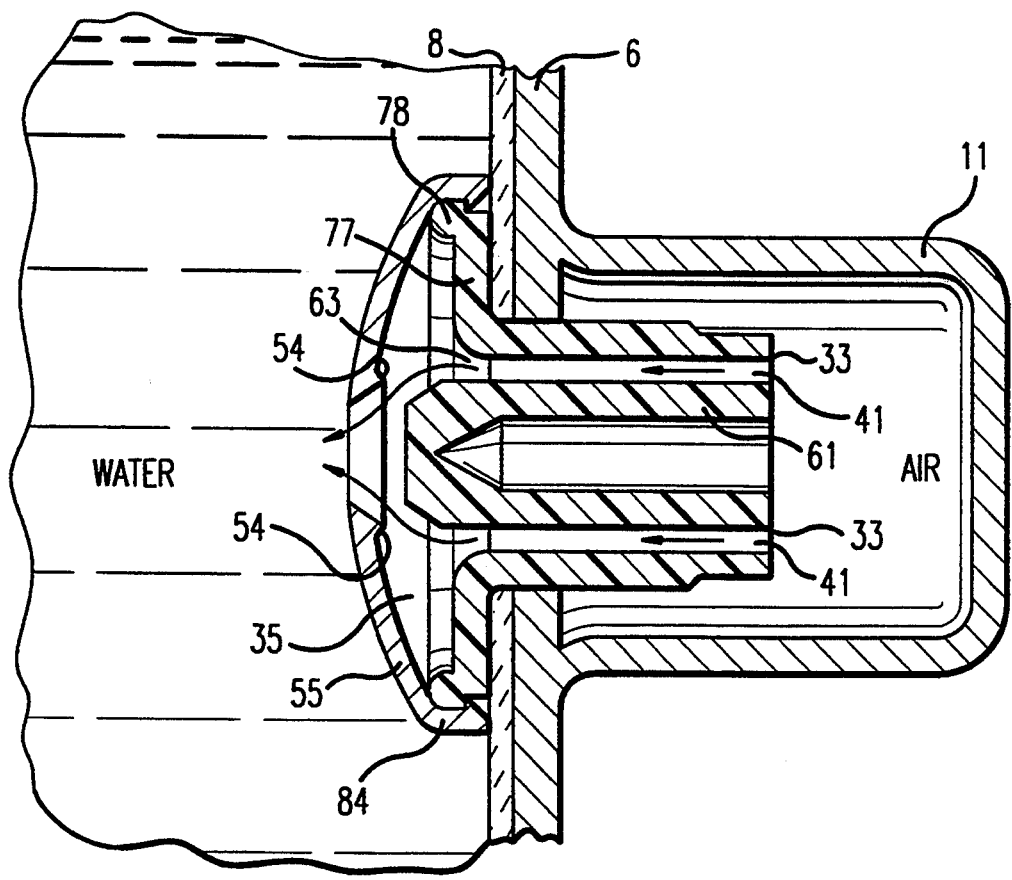
Figure 12:
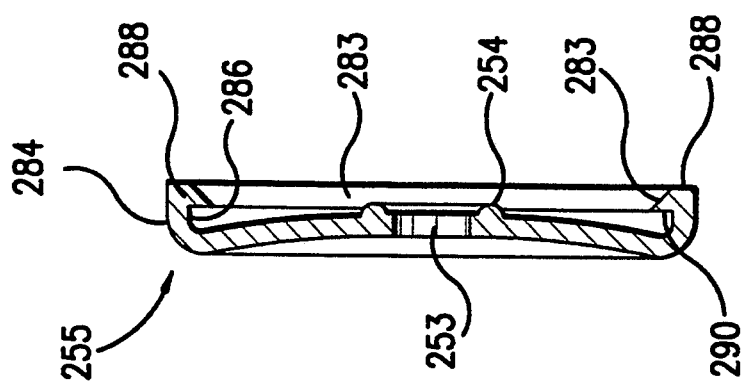
FIG. 12 is a cross sectional view according to XII—XII of the membrane of FIG. 10.
Figure 11:
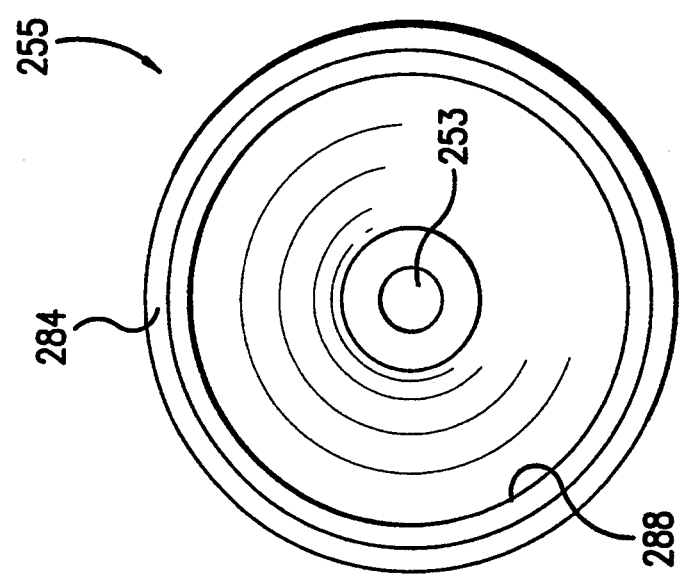
FIGS. 10 and 11 are top and bottom view of a membrane usable in a check valve according to a second preferred embodiment of the invention.
Figure 10:
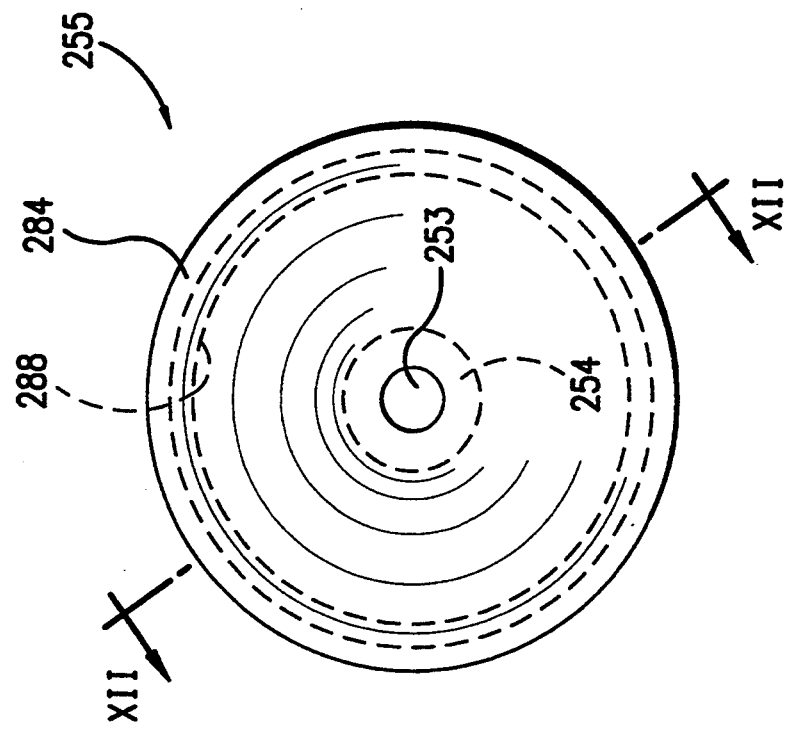
Figure 13:
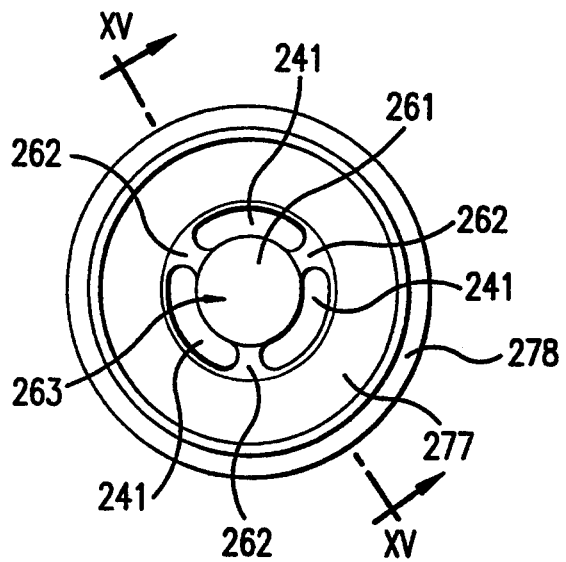
FIG. 13 is a front elevational view of a casing of a check valve according to a second preferred embodiment of the invention.
Figure 14:
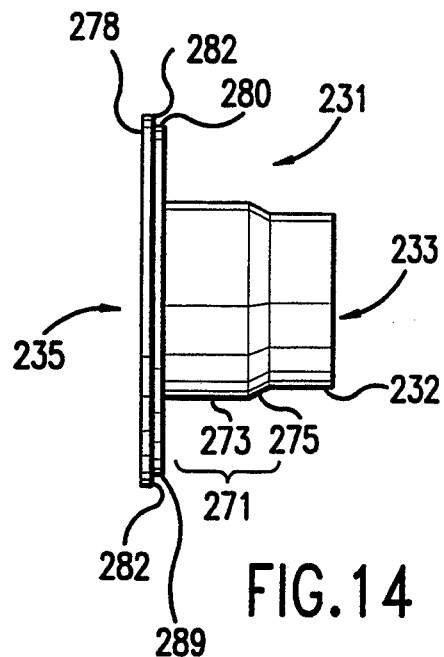
FIG. 14 is a side elevational view of the casing of FIG. 13.
Figure 15:
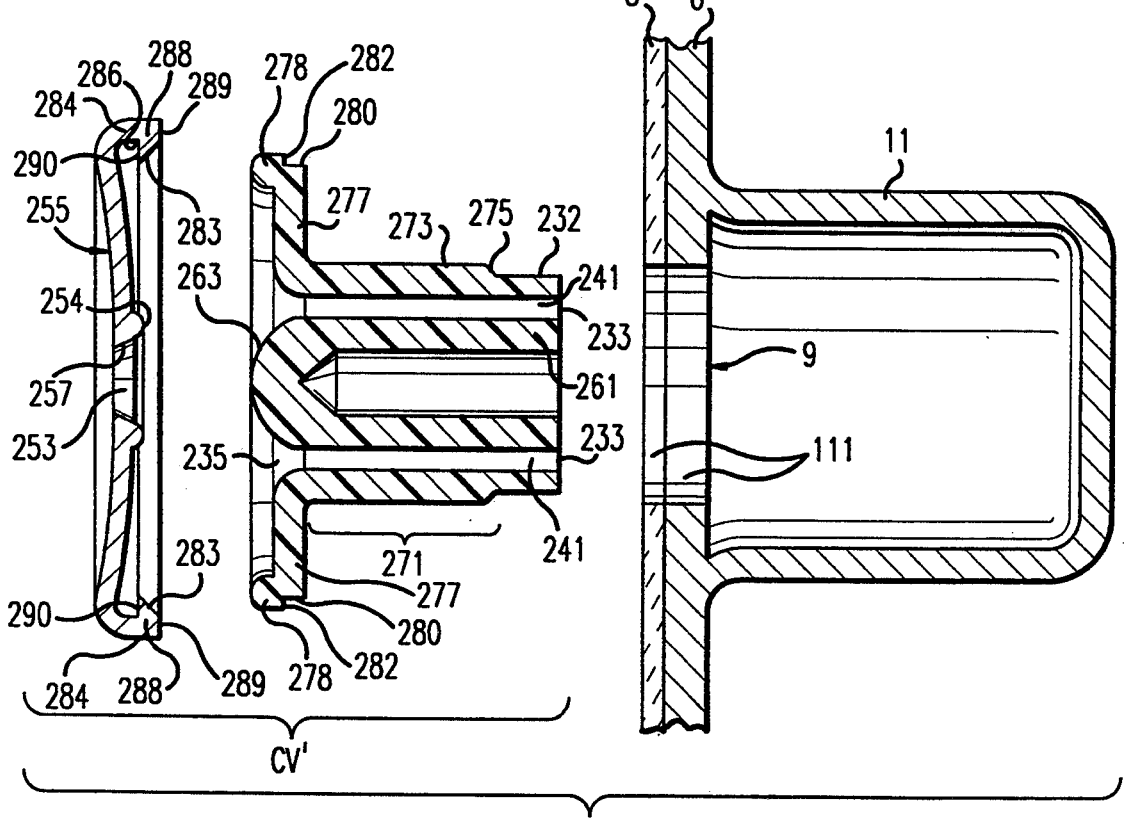
FIG. 15 is an exploded view illustrating how the membrane (which is represented as a cross sectional view according to XII—XII of FIG. 10) is fastened on the casing (which is represented as a cross sectional view according to XV—XV of FIG. 13), and how the casing is positioned across a corresponding opening of a wall of the tub (which is represented according to a cross sectional view)
Figure 17:
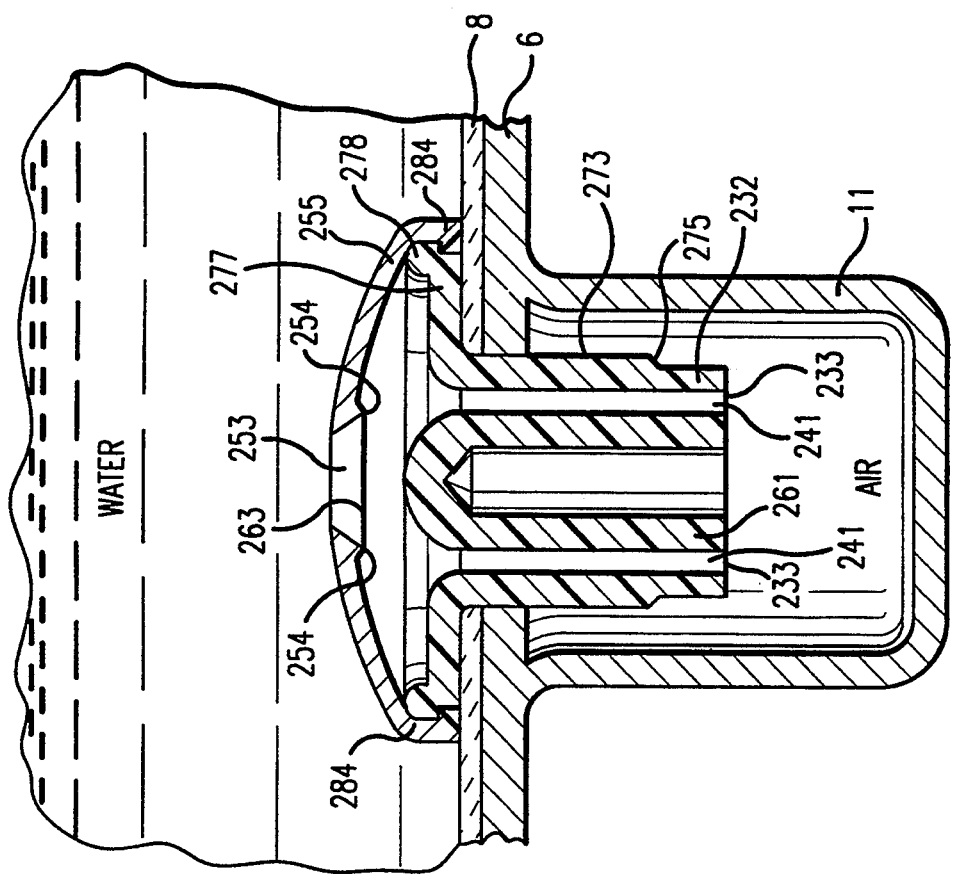
FIGS. 16 and 17 represent the check valve of FIG. 15 in a closed and an open position, respectively.
Figure 16:
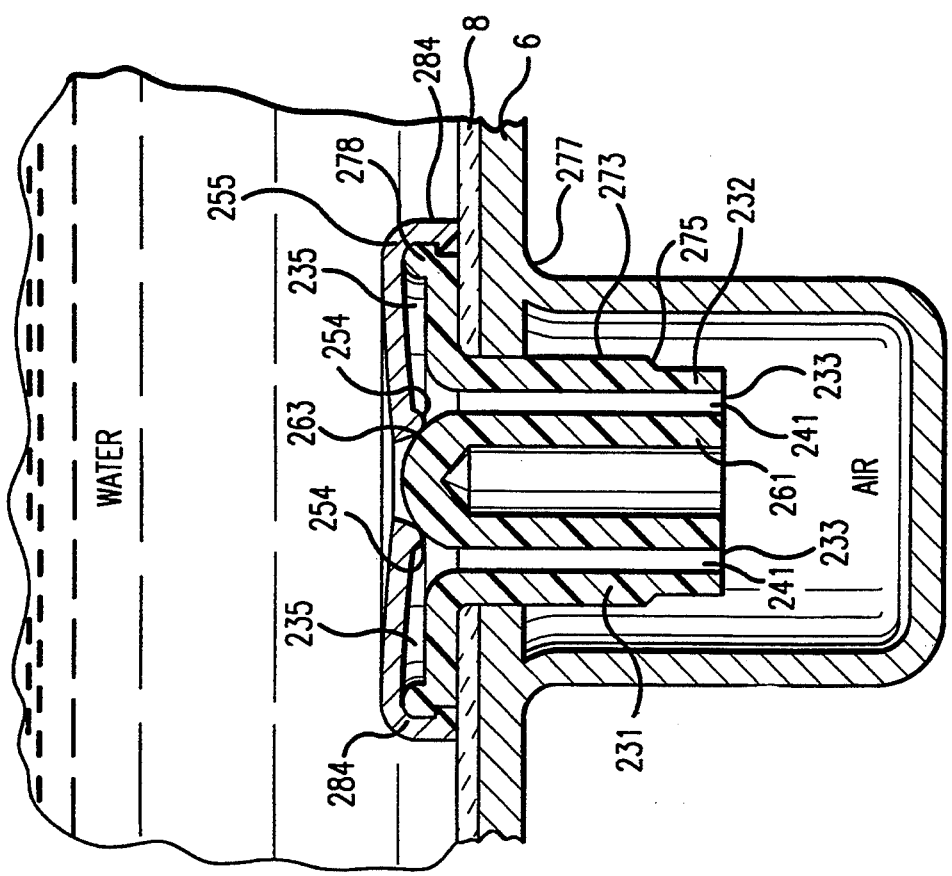

More particularly, means for axially setting and fastening casing 31 (or 231) of check valve "CV" (or "CV'") to seal a corresponding opening 9 (which is provided with an inner cylindrical surface 111 (see FIG. 7 (or 15))) may consist of:

A collar 71 (or 271) comprising a portion 73 (or 273) of cylindrical outer surface and, eventually a portion 75 (or 275) of conical outer surface. The cylindrical surface of portion 73 (or 273) has a diameter slightly greater than the diameter of cylindrical surface 111. The diameter of cylindrical surface 111 of an opening 9 may be either the one of an opening provided in a therapeutic bath already in use or the one resulting of the drilling of such an opening with a drill of appropriate diameter (e.g. 0.50 inch).

A flange 77 (or 277) as defined hereinbefore. Casing 31 (or 231) may be provided, advantageously, with a longitudinal surface 32 (or 232). Its diameter at inlet end of the casing is preferably smaller than the diameter of surface 111. Casing 31 (or 231), collar 71 (or 271), flange 77 (or 277), rim 78 (or 278), element 61 (or 261) and member(s) 62 (or 262) are advantageously integral to each other and are preferably made with an appropriate plastic material. (They may be manufactured by usual moulding techniques). An example of a preferred plastic material is thermoplastic elastomer having a durometer value of 40 shore D.

More particularly, an example of preferred elastomeric material for the membrane would be a thermoplastic elastomer having a durometer value of 55 shore A. This membrane may be manufactured by usual moulding techniques.

To position and fasten a membrane 55 (or 255) on the casing, 31 (or 231), the following steps are carried out:

The membrane 55 (or 255) is axially aligned with the longitudinal axis of the casing 31 (or 231) and moved toward the outlet 35 (or 235) until the bevelled surface 83 (or 283) engage the rim 78 (or 278) of the casing 31 (or 231). Then the membrane is pushed (with hand) and the skirt 84 (or 284) is disformed when the surface 83 (or 283) moves on the rim 78 (or 278) until the shoulder 90 is positioned underneath the shoulder 82 by the elasticity of the skirt 84.

To remove the membrane 55 (or 255) from the casing 31 (or 231), the skirt 84 (or 284) is disformed with fingers to pass the rib 88 (or 288) over the rim 78 (or 278).

For mounting a check valve "CV" (or "CV'") in a corresponding-opening 9, the following steps are carried out:

The inlet end 33 (or 233) of casing 31 (or 231) is axially aligned with the axis of opening 9 (which may have been drilled, if necessary, to increase its diameter when check valve "CV" (or "CV'") has to be mounted through a corresponding side opening or floor opening of a hydromassaging apparatus).

Surface 32 (or 232) is engaged in said opening 9 and then casing 31 (or 231) is axially pushed (with hands) until surface 111 contact portion 75 (or 275). Then, casing 31 (or 231) is axially pushed in opening 9 (with hands or, if necessary, with an appropriate tool such as a hammer) until surface 111 is successively forced over the remaining portion of portion 75 (or 275) and over portion 73 (or 273), and until the flange 77 (or 277) or the edge 89 (or 289) of the skirt 84 (or 284) abuts with the coating 8. Under the pressure exerted by surface 111 against portion 73 (or 273), the casing 31 (or 231) is slightly disformed and friction existing between surface 111 cylindrical surface of portion 73 (or 273) is sufficient to seal and retain the casing in said opening. Advantageously, another tightness zone may be defined to seal the casing 31 (or 231) with respect to the opening 9 when the rib 88 (or 288) is pinched between the shoulder 82 (or 282) and the coating 8. This other tightness zone also prevents any introduction of water between the flange 77 (or 277) and the coating 8.

To remove a casing 31 (or 231) of check valve "CV" (or "CV'") from an opening 9, one only has to inverse the aforesaid sequence and used his fingers or appropriate tools (such as a thin small instrument, especially the blade of a screwdriver or of a penknife).

Of course, it should be possible to use an adhesive or cement between surface 111 and portion 73 (or 273) to further seal the casing 31 (or 231) in the opening 9. However, this is facultative and friction existing between surface 111 and portion 73 (or 273) is generally sufficient to seal the casing in opening 9 and make opening 53 (or 253) the sole passageway through which a pressurized flow of air can flow.

The invention also relates to an improvement to an apparatus HA, as illustrated in FIGS. 1 and 2. This improvement consists of a check valve "CV" as shown in FIGS. 3 to 9 or "CV'" as shown in FIGS. 10 to 17, mounted across each opening 9 in order to allow a pressurized flow of air generated by the fan 13 to circulate successively through said ducts 11 and through said check valve "CV" (or "CV'") mounted through said openings 9, and then to bubble in water "W" and when the fan 13 is stopped to prevent any introduction of water "W" toward said ducts 11. The use of check valve "CV" or "CV'" which allow to keep dry ducts 11 and thus prevent any growth of bacteria and/or fungi therein, further allow to be substantially free of recess in which accumulation of water could occured and is very easy to clean, to thereby avoid any growth of bacteria and/or fungi thereon.

In use, a first embodiment of hydromassaging apparatus according to the invention (which is defined by the combination of an apparatus HA as shown in FIGS. 1 and 2 with a check valve "CV" as shown in FIGS. 3 to 9 mounted through each of its openings 9) works as follows:

The tub of the apparatus HA is filled with water by any appropriate means well known to one skilled in the art (e.g. faucets 112 shown in FIG. 1) to a level "L" which is set above said check valves "CV". Then, for each check valve "CV", water "W" applies a pressure against one face of the membrane 55 and press a portion thereof surrounding the opening 53 (especially the sidewall 57) against the seat 63 in order to close the check valve "CV" and prevent any flow of water "W" from the outlet 35 toward the inlet 33. Thus, ducts 11 are kept dry and there is no substantial recess on the outlet side of the check valve "CV" in which water could accumulate when the apparatus is emptied.

Then, fan 13 is started and a flow of pressurized air is allowed to circulate through ducts 11 and conduits 41 and then to bubble (especially in jet form) in water. Of course, the force exerted by the pressurized flow of air against one face of the membrane 55 ought to be greater than the pressure exerted by water "W" against opposite face of the membrane plus the pressure resulting from the elasticity of the membrane that presses a portion thereof surrounding the orifice 53 (especially the sidewall 57) against the seat 63, so that said membrane be disformed and the orifice be moved away from the seat 63 to allow a fluid communication between inlet 33 and outlet 35 and allow the pressurized flow of air to create jet of bubbles in water "W". (N.B. jet of bubbles was voluntary omitted in FIG. 9 for clarity purpose). When the fan is stopped, pressure applied by water against one face of the membrane 55 plus the pressure resulting from the elasticity of the membrane which is disformed by the air, become greater than pressure of air contained in ducts 11 and applied against opposite face of the membrane 55. When this occurs, the membrane 55, (especially the sidewall 57) is moved against the seat 63 to cover orifice 53 and prevent any fluid communication between outlet 35 and inlet 33 through said orifice 53.

Advantageously, the elasticity of the membrane is selected in such a way that even when the sidewall 57 is pressed against the seat 63, the pressure of air in ducts 11 is still greater than the water pressure in the tub against the membrane 55. This allows to ensure a water tight check valve "CV". Indeed, if the check valve "CV" was open, air could still be streaming out and water could not enter.

Water contained in the apparatus HA may be removed by any appropriate means well known to one skilled in the art (e.g. a drain 113 provided in the bottom 1).

In use, a second embodiment of hydromassaging apparatus HA according to the invention (which is defined by the combination of an apparatus HA as shown in FIGS. 1 and 2 with an improved check valve "CV'" as shown in FIGS. 10 to 17) works as follows:

The tub of the apparatus HA is filled with water by any appropriate means well known to one skilled in the art (e.g. faucets 112 shown in FIG. 1) to a level "L" which is set above said check valves "CV'". Then, for each check valve "CV'", water "W" applies a pressure against one face of the membrane 255 and further press the rib 254 against the flap seat 263 in order to close the check valve "CV'" and prevent any flow of water "W" from the outlet 235 toward the inlet 233. Thus, ducts 11 are kept dry and there is no substantial recess on the outlet side of the check valve "CV'" in which water could accumulate, when the apparatus is emptied.

Then, fan 13 is started and a flow of pressurized air is allowed to circulate through ducts 11 and conduits 241. When the pressure applied by the air against one face of the membrane 255 is is higher than the pressure applied by the water on the opposite side of the membrane plus the pressure resulting from the elasticity of the membrane that presses the ring 254 against the seat 263, then the ring 254 is moved away from the seat and because the shape and elasticity of the membrane, the spherical radius of curvature of the membrane is inversed, under the pressure of air, (i.e. the membrane "pops up" and the orifice 253 (especially the ring 254) is moved away from the seat 263, to allow the pressurized flow of air to create jet of bubbles in water "W". (N.B. jet of bubbles was voluntary omitted in FIG. 17 for clarity purpose). Because the shape and elasticity of the membrane, a relatively small pressure variation around the pressure value defined by the shape and elasticity of the membrane, will active the "snap action" and inverse the spherical radius Of curvature of the membrane to move the orifice 253 either at a substantial distance from the seat 263, or press against the seat 263.

When the fan is stopped, the pressure of air decreases and the pressure applied by water against one face of the membrane plus the pressure resulting from the elasticity of the membrane 255 which tends to move the ring 254 toward the seat 263, become greater than the pressure of air contained in ducts 11. Thus, when the pressure of air becomes insufficient to keep the radius of curvature inversed (i.e. to keep the ring 254 at a substantial distance from the seat 263), then the membrane returns to its original spherical radius of curvature (i.e. the membrane "pops back") and the ring 254 is pressed against the seat 263, to prevent any fluid communication between outlet 235 and inlet 233 through said orifice 253. Advantageously, because the shape and an appropriate selection of the elasticity of the membrane 255, even when the ring 254 is pressed against the seat 263, the pressure of air is still greater than water pressure. This allows to ensure a water tight check valve "CV'". Indeed, if the check valve "CV'" was open, air would still be streaming out and water could not enter.

Water contained in the apparatus HA may be removed by any appropriate means well known to one skilled in the art (e.g. a drain 113 provided in the bottom 1).

As a non-limitative example, check valves according to the invention may have the following size characteristics:

| | |
|---|---|
| diameter of surface 73 or 273 (when intended to be introduced in an opening 9 whose surface 111 has a diameter of 0.50 inch) | 0.52 inch |

Again, above mentioned preferred embodiments of the invention are not limitative, and therefore, the invention also extends to any variants or equivalents that would be obvious for person skilled in the art.

The embodiments of the invention in which an exclusive property or privilege is claimed are defined as follows:

1. In a check valve comprising a casing having opposite ends, and being provided with a longitudinal axis, at least one longitudinal, outer surface, an inlet at one end of said casing and an outlet at the opposite end of said casing defining a conduit extending from said inlet to said outlet, and pressure responsive means adapted to react to a differential of pressure existing between opposite faces of a membrane in order to either allow a fluid communication from the inlet to the outlet, or prevent any fluid communication from the outlet to the inlet, the improvement wherein said pressure responsive means comprising:

a flexible membrane made of elastomeric material, provided with an orifice, said membrane having an inner face and an outer face, an element provided with a seat of sufficient size to completely cover the orifice, means for connecting the element with the casing and positioning the seat in the vicinity of the outlet of the casing, means for fastening the periphery of the membrane on the casing, to position the membrane across the outlet of the casing, to align the orifice with the seat and to position said orifice in such a way with respect to the seat that the elasticity of the membrane presses a portion thereof surrounding the orifice against the seat, and with the proviso that when the pressure applied by a first fluid on the outer face of the membrane plus the pressure resulting from the elasticity of the membrane that presses the portion of membrane surrounding the orifice against the seat, is higher than the pressure applied by a second fluid on the inner face of said membrane, then said portion of membrane surrounding the orifice is pressed against the seat closing the check valve to prevent any fluid communication from the outlet to the inlet: of the casing, and when the pressure applied by said second fluid on the inner face of the membrane is higher than the pressure applied by the first fluid against the outer face of the membrane plus the pressure resulting from the elasticity of the membrane that presses the portion of membrane surrounding the orifice against the seat, then the membrane is disformed and the portion thereof surrounding the orifice is moved away from the seat opening the check valve to allow a fluid communication from the inlet to the outlet of the casing; wherein the membrane is shaped to have, initially when no pressure is applied by the first and second fluids on the opposite faces of the membrane, a spherical radius of curvature, and the elasticity of the membrane presses the portion thereof surrounding the orifice, against the seat, and with the proviso that:

the portion of membrane surrounding the orifice is pressed against the seat by snap action to close the check valve; and the portion of membrane surrounding the orifice is disformed and moved away from the seat until it is substantially co-planar with the periphery of the membrane, and because of the shape and elasticity of the membrane, the radius of curvature of the membrane is inverted by the pressure of the second fluid and the orifice is moved by snap action a substantial distance from the seat to open the check valve.

2. In a check valve intended to be mounted across a corresponding opening of a hydromassaging apparatus of the type comprising:

a tub having a bottom wall and side walls and being intended to be filled with water to a determined level, at least one of said walls being provided with openings below said determined level of water;

generation means adapted to generate a flow of pressurized air; and duct means positioned in fluid communication between said openings and generation means adapted to generate a flow of pressurized air so that said flow can circulate from said generation means through said duct means and openings and then bubble in water;

said check valve comprising a casing having opposite ends and being provided with a longitudinal axis, at least one longitudinal outer surface, an inlet at one end of said casing, said inlet being intended to be put in fluid communication with said duct means, an outlet at the opposite end of said casing, said outlet being intended to be put in fluid communication with an interior of said tub, said casing defining a conduit extending from said inlet to said outlet, and pressure responsive means adapted to react to a differential of pressure existing between opposite faces of a membrane in order to either allow a fluid communication from the inlet to the outlet, or prevent any fluid communication from the outlet to the inlet, said casing being further provided with means adapted for axially setting and fastening said check valve to seal a corresponding opening of the tub, the improvement wherein said pressure responsive means comprising:

a flexible membrane made of elastomeric material, provided with an orifice, said membrane having an inner face and an outer face, an element provided with a seat of sufficient size to completely cover the orifice, means for connecting the element with the casing and positioning the seat in the vicinity of the outlet of the casing, means for fastening the periphery of the membrane on the casing, to position the membrane across the outlet of the casing, to align the orifice with the seat and to position said orifice in such a way with respect to the seat that the elasticity of the membrane presses a portion thereof surrounding the orifice against the seat, and with the proviso that when the pressure applied by the water of the tub on the outer face of the membrane plus the pressure resulting from the elasticity of the membrane that presses the portion of membrane surrounding the orifice against the seat, is higher than the pressure applied by the air on the inner face of said membrane, then said portion of membrane surrounding the orifice is pressed against the seat closing the check valve to prevent any fluid communication from the tub to the duct means, and when the pressure applied by the air on the inner face of the membrane is higher than the pressure applied by the water against the outer face of the membrane plus the pressure resulting from the elasticity of the membrane that presses the portion of membrane surrounding the orifice against the seat, then the membrane is disformed and the portion thereof surrounding the orifice is moved away from the seat opening the check valve to allow a fluid communication from the duct means to the tub and thus allow the pressurized air to bubble in water;

wherein the membrane is shaped to have, initially when no pressure is applied by water or air on the opposite faces of the membrane, a spherical radius of curvature, and the elasticity of the membrane presses the portion thereof surrounding the orifice, against the seat, and with the proviso that:

the portion of membrane surrounding the orifice is pressed against the seat by snap action to close the check valve to prevent any fluid communication from the tub to the duct means; and when portion of membrane surrounding the orifice is disformed and moved away from the seat, and because of the shape and elasticity of the membrane, the radius of curvature of the membrane is inverted by the pressure of air and the orifice is moved, by snap action, a substantial distance from the seat to open the check valve.

3. A check valve according to claim 2, wherein the longitudinal outer surface of the casing includes at least a portion thereof that is cylindrical and wherein the means for fastening the membrane across the outlet of the casing and to align the orifice with the seat, consist of:

a flange radially extending outwardly from the outer surface of the casing, said flange having a rim of determined shape and periphery, a skirt extending from a periphery of the membrane, said skirt being provided with an inner surface of such a shape and periphery that it matches over the rim of the flange, a protuberance provided on the inner surface of the skirt and spaced away from the membrane, said protuberance being of such size and shape that the rim of the flange is positionable between one face of the membrane and the protuberance.

4. A check valve according to claim 3, wherein the seat has a predetermined shape, wherein the portion of membrane surrounding the orifice is thickened and wherein the orifice has a sidewall, the sidewall of the orifice being sized and shaped to match with the predetermined shape of the seat.

5. A check valve according to claim 4, wherein the means for connecting the element with the casing consist of at least one connecting member having opposite ends, one end thereof making an integral part of the conduit, the opposite end being integral with the element.

6. A check valve according to claim 5, wherein there is from two to four connecting members evenly distributed around the element.

7. A check valve according to claim 6, wherein the means for axially setting and fastening it to seal a corresponding opening of a wall of a tub, consist of:

an opening of circular cross section which defines a cylindrical surface of contact in said wall, said cylindrical surface having a diameter, a collar making an integral part with the outer surface of the casing and being provided with an outer cylindrical surface having a diameter slightly greater than the one of the cylindrical surface of the opening, the flange radially extending outwardly from the outer surface of the casing, a edge of the skirt that is opposite the periphery of the membrane, the collar being intended to be engaged against the cylindrical surface of the opening provided in the wall until the edge of the skirt is pressed against the portion of the wall surrounding the opening.

8. A check valve according to claim 7, wherein the rim is provided with a recess, the protuberance engages the recess, and the portion of the edge of the skirt is intended to be pressed by the rim against the portion of wall of the tub surrounding the opening.

9. A check valve according to claim 2, wherein the longitudinal outer surface of the casing includes at least a portion thereof that is cylindrical and wherein the means for fastening the membrane across the outlet of the casing and to align the orifice with the seat, consist of:

a flange radially extending outwardly from the outer surface of the casing, said flange having a rim of determined shape and periphery, a skirt extending from a periphery of the membrane, said skirt being provided with an inner surface of such a shape and periphery that it matches over the rim of the flange, a protuberance provided on the inner surface of the skirt and spaced away from the membrane, said protuberance being of such size and shape that the rim of the flange is positionable between one face of the membrane and the protuberance.

10. A check valve according to claim 9, wherein the seat has a hemi-spherical shape, wherein the portion of membrane surrounding the orifice is thickened and wherein the orifice has a rounded sidewall, sized and shaped to match with the hemi-spherical seat.

11. A check valve according to claim 10, wherein the means for connecting the element with the casing consist of at least one connecting member having opposite ends, one end thereof making an integral part of the conduit, the opposite end being integral-with the element.

12. A check valve according to claim 11, wherein there is from two to four connecting members evenly distributed around the element.

13. A check valve according to claim 12, wherein the means for axially setting and fastening it to seal a corresponding opening of a wall of a tub, consist of:

an opening of circular cross section Which defines a cylindrical surface of contact in said wall, said cylindrical surface having a diameter, a collar making an integral part with the outer surface of the casing and being provided with an outer cylindrical surface having a diameter slightly greater than the one of the cylindrical surface of the opening, the flange radially extending outwardly from the outer surface of the casing, a edge of the skirt that is opposite the periphery of the membrane, the collar being intended to be engaged against the cylindrical surface of the opening provided in the wall until the edge of the skirt is pressed against the portion of the wall surrounding the opening.

14. A check valve according to claim 13, wherein the rim is provided with a recess, the protuberance engages the recess and the portion of the edge of the skirt is intended to be pressed by the rim against the portion of wall of the tub surrounding the opening.

15. In a hydromassaging apparatus of the type comprising: a tub having a bottom wall and side walls and being intended to be filled with water to a determined level, at least one of said walls being provided with openings below said determined level of water, a check valve being mounted across each of said openings; generation means adapted to generate a flow of pressurized air; duct means positioned in fluid communication between said openings and generation means through said duct means and openings, and then jet into water; the improvement wherein each check valve comprises:

a casing having opposite ends and being provided with a longitudinal axis, at least one longitudinal outer surface, an inlet at one end of said casing, said inlet being intended to be put in fluid communication with said duct means, an outlet at the opposite end of said casing, said outlet being intended to be put in fluid communication with an interior of said tub, said casing defining a conduit extending from said inlet to said outlet, and pressure responsive means adapted to react to a differential of pressure existing between opposite faces of a membrane in order to either allow a fluid communication from the inlet to the outlet, or prevent any fluid communication from the outlet to the inlet, said casing being further provided with means adapted for axially setting and fastening said check valve to seal a corresponding opening of the tub, the improvement wherein said pressure responsive means comprising:

a flexible membrane made of elastomeric material, provided with an orifice, said membrane having an inner face and an outer face, an element provided with a seat of sufficient size to completely cover the orifice, means for connecting the element with the casing and positioning the seat in the vicinity of the outlet of the casing, means for fastening the periphery of the membrane on the casing, to position the membrane across the outlet of the casing, to align the orifice with the seat and to position said orifice in such a way with respect to the seat that the elasticity of the membrane presses a portion thereof surrounding the orifice against the seat, and with the proviso that when the pressure applied by the water of the tub on the outer face of the membrane plus the pressure resulting from the elasticity of the membrane that presses the portion of membrane surrounding the orifice against the seat, is higher than the pressure applied by the air on the inner face of said membrane, then said portion of membrane surrounding the orifice is pressed against the seat closing the check valve to prevent any fluid communication from the tub to the duct means, and when the pressure applied by the air on the inner face of the membrane is higher than the pressure applied by the water against the outer face of the membrane plus the pressure resulting from the elasticity of the membrane that presses the portion of membrane surrounding the orifice against the seat, then the membrane is disformed and the portion thereof surrounding the orifice is moved away from the seat opening the check valve to allow a fluid communication from the duct means to the tub and thus allow the pressurized air to bubble in water;

wherein the membrane is shaped to have, initially when no pressure is applied by water or air on the opposite faces of the membrane, a spherical radius of curvature, and the elasticity of the membrane presses the portion thereof surrounding the orifice, against the seat, and with the proviso that:

the portion of membrane surrounding the orifice is pressed against the seat by snap action to close the check valve to prevent any fluid communication from the tub to the duct means; and when the portion of membrane surrounding the orifice is disformed and moved away from the seat, and because of the shape and elasticity of the membrane, the radius of curvature of the membrane is inverted by the pressure of air and the orifice is moved, by snap action, a substantial distance from the seat to open the check valve;

wherein the longitudinal outer surface of the casing includes at least a portion thereof that is cylindrical and wherein the means for fastening the membrane across the outlet of the casing and to align the orifice with the seat, consist of:

a flange radially extending outwardly from the outer surface of the casing, said flange having a rim of determined shape and periphery, a skirt extending from a periphery of the membrane, said skirt being provided with an inner surface of such a shape and periphery that it matches over the rim of the flange, a protuberance provided on the inner surface of the skirt and spaced away from the membrane, said protuberance being of such size and shape that the rim of the flange is positionable between one face of the membrane and the protuberance;

wherein the seat has a predetermined shape, wherein the portion of membrane surrounding the orifice is thickened and wherein the orifice has a sidewall, the sidewall of the orifice being sized and shaped to match with the predetermined shape of the seat;

wherein the means for connecting the element with the casing consist of at least one connecting member having opposite ends, one end thereof making an integral part of the conduit, the opposite end being integral with the element;

wherein there are from two to four connecting members evenly distributed around the element;

wherein the means for axially setting and fastening it to seal a corresponding opening of a wall of a tub, consist of:

an opening of circular cross section which defines a cylindrical surface of contact in said wall, said cylindrical surface having a diameter, a collar making an integral part with the outer surface of the casing and being provided with an outer cylindrical surface having a diameter slightly greater than the one of the cylindrical surface of the opening, the flange radially extending outwardly from the outer surface of the casing, a edge of the skirt that is opposite the periphery of the membrane, the collar being intended to be engaged against the cylindrical surface of the opening provided in the wall until the edge of the skirt is pressed against the portion of the wall surrounding the opening; and wherein the rim is provided with a recess, a protuberance engages the recess, and the portion of the edge of the skirt is intended to be pressed by the rim against the portion of wall of the tub surrounding the opening.

16. In a hydromassaging apparatus of the type comprising: a tub having a bottom wall and side walls and being intended to be filled with water to a determined level, at least one of said walls being provided with openings below said determined level of water, a check valve being mounted across each of said openings; generation means adapted to generate a flow of pressurized air; duct means positioned in fluid communication between said openings and generation means through said duct means and opening, and then jet into water; the improvement wherein each check valve comprises a casing having opposite ends and being provided with a longitudinal axis, at least one longitudinal outer surface, an inlet at one end of said casing, said inlet being intended to be put in fluid communication with said duct means, an outlet at the opposite end of said casing, said outlet being intended to be put in fluid communication with an interior of said tub, said casing defining a conduit extending from said inlet to said outlet, and pressure responsive means adapted to react to a differential or pressure existing between opposite faces of a membrane in order to either allow a fluid communication from the inlet to the outlet, or prevent any fluid communication from the outlet to the inlet, said casing being further provided with means adapted for axially setting and fastening said check valve to seat a corresponding opening of the tub, the improvement wherein the pressure responsive means comprising:

a flexible membrane made of elastomeric material, provided with an orifice, said membrane having an inner face and an outer face, an element provided with a seat of sufficient size to completely cover the orifice, means for connecting the element with the casing and positioning the seat in the vicinity of the outlet of the casing, means for fastening the periphery of the membrane on the casing, to position the membrane across the outlet of the casing, to align the orifice with the seat and to position said orifice in such a way with respect to the seat that the elasticity of the membrane presses a portion thereof surrounding the orifice against the seat, and with the proviso that when the pressure applied by the water of the tub on the outer face of the membrane plus the pressure resulting from the elasticity of the membrane that presses the portion of membrane surrounding the orifice against the seat, is higher than the pressure applied by the air on the inner face of said membrane, then said portion of membrane surrounding the orifice is pressed against the seat closing the check valve to prevent any fluid communication from the tub to the duct means, and when the pressure applied by the air on the inner face of the membrane is higher than the pressure applied by the water against the outer face of the membrane plus the pressure resulting from the elasticity of the membrane that presses the portion of membrane surrounding the orifice against the seat, then the membrane is disformed and the portion thereof surrounding the orifice is moved away from the seat opening the check valve to allow a fluid communication from the duct means to the tub and thus allow the pressurized air to bubble in water; wherein the membrane is shaped to have, initially when no pressure is applied by water or air on the opposite faces of the membrane, a spherical radius of curvature, and the elasticity of the membrane presses the portion thereof surrounding the orifice, against the seat, and with the proviso that:

the portion of membrane surrounding the orifice is pressed against the seat by snap action to close the check valve to prevent any fluid communication from the tub to the duct means; and when the portion of membrane surrounding the orifice is disformed and moved away from the seat, and because of the shape and elasticity of the membrane, the radius of curvature of the membrane is inverted by the pressure of air and the orifice is moved, by snap action, a substantial distance from the seat to open the check valve;

wherein the longitudinal outer surface of the casing includes at least a portion thereof that is and wherein means for fastening the membrane across the outlet of the casing and to align the orifice with the seat, consist of:

a flange radially extending outwardly from the outer surface of the casing, said flange having a rim of determined shape and periphery;

a skirt extending from a periphery of the membrane, said skirt being provided with an inner surface of such a shape and periphery that it matches over the rim of the flange;

a protuberance provided on the inner surface of the skirt and spaced away from the membrane, said protuberance being of such size and shape that the rim of the flange is positionable between one face of the membrane and the protuberance;

wherein the seat has a hemispherical shape, wherein the portion of membrane surrounding the orifice is thickened and wherein the orifice has a rounded sidewall, sized and shaped to match with the hemispherical seat;

wherein the means for connecting the element with the casing consist of at least one connecting member having opposite ends, one end thereof making an integral part of the conduit, the opposite end being integral with the element;

wherein there are from two and four connecting members evenly distributed around the element;

wherein the means for axially setting and fastening it to seal a corresponding opening of a wall of a tub, consist of:

an opening of circular cross section which defines a cylindrical surface of contact in said wall, said cylindrical surface having a diameter, a collar making an integral part with the outer surface of the casing and being provided with an outer cylindrical surface having a diameter slightly greater than the one of the cylindrical surface of the opening, the flange radially extending outwardly from the outer surface of the casing, a edge of the skirt that is opposite the periphery of the membrane, and the collar being intended to be engaged against the cylindrical surface of the opening provided in the wall until the edge of the skirt is pressed against the portion of the wall surrounding the opening.

17. In a hydromassaging apparatus of the type comprising: a tub having a bottom wall and side walls and being intended to be filled with water to a determined level, at least one of said walls being provided with openings below said determined level of water, a check valve being mounted across each of said openings; generation means adapted to generate a flow of pressurized air; duct means positioned in fluid communication between said openings and generation means through said duct means and openings, and then jet into water; the improvement wherein each check valve comprises a casing having opposite ends and being provided with a longitudinal axis, at least one longitudinal outer surface, an inlet at one end of said casing, said inlet being intended to be put in fluid communication with said duct means, an outlet at the opposite end of said casing, said outlet being intended to be put in fluid communication with an interior of said tub, said casing defining a conduit extending from said inlet to said outlet, and pressure responsive means adapted to react to a differential of pressure existing between opposite faces of a membrane in order to either allow a fluid communication from the inlet to the outlet, or present any fluid communication from the outlet to the inlet, said casing being further provided with means adapted for axially setting and fastening said check valve to seal a corresponding opening of the tub, the improvement wherein said pressure responsive means comprising:

a flexible membrane made of elastomeric material, provided with an orifice, said membrane having an inner face and an outer face, an element provided with a seat of sufficient size to completely cover the orifice, means for connecting the element with the casing and positioning the seat in the vicinity of the outlet of the casing, means for fastening the periphery of the membrane on the casing, to position the membrane across the outlet of the casing, to align the orifice with the seat and to position said orifice in such a way with respect to the seat that the elasticity of the membrane presses a portion thereof surrounding the orifice against the seat, and with the proviso that when the pressure applied by the water of the tub on the outer face of the membrane plus the pressure resulting from the elasticity of the membrane that presses the portion of membrane surrounding the orifice against the seat, is higher than the pressure applied by the air on the inner face of said membrane, then said portion of membrane surrounding the orifice is pressed against the seat closing the check valve to prevent any fluid communication from the tub to the duct means, and when the pressure applied by the air on the inner face of the membrane is higher than the pressure applied by the water against the outer face of the membrane plus the pressure resulting from the elasticity of the membrane that presses the portion of membrane surrounding the orifice against the seat, then the membrane is disformed and the portion thereof surrounding the orifice is moved away from the seat opening the check valve to allow a fluid communication from the duct means to the tub and thus allow the pressurized air to bubble in water;

wherein the membrane is shaped to have, initially when no pressure is applied by water or air on the opposite faces of the membrane, a spherical radius of curvature, and the elasticity of the membrane presses the portion thereof surrounding the orifice, against the seat, and with the proviso that:

the portion of membrane surrounding the orifice is pressed against the seat by snap action to close the check valve to prevent any fluid communication from the tub to the duct means; and when the portion of membrane surrounding the orifice is disformed and moved away from the seat, and because of the shape and elasticity of the membrane, the radius of curvature of the membrane is inverted by the pressure of air and the orifice is moved, by snap action, substantial distance from the seat to open the check valve; wherein the longitudinal outer surface of the casing includes at least a portion thereof that is cylindrical and wherein means for fastening the membrane across the outlet of the casing and to align the orifice with the seat, consist of:

a flange radially extending outwardly from the outer surface of the casing, said flange having a rim of determined shape and periphery, a skirt extending from a periphery of the membrane, said skirt being provided with an inner surface of such a shape and periphery that it matches over the rim of the flange, a protuberance provided on the inner surface of the skirt and spaced away from the membrane, said protuberance being of such size and shape that the rim of the flange is positionable between one face of the membrane and the protuberance;

wherein the seat has a hemispherical shape, wherein the portion of membrane surrounding the orifice is thickened and wherein the orifice has a rounded sidewall, sized and shaped to match with the hemispherical seat;

wherein the means for connecting the element with the casing consist of at least one connecting member having opposite ends, one end thereof making an integral part of the conduit, the opposite end being integral with the element;

wherein there are from 2 to 4 connecting members evenly distributed around the element wherein the means for axially setting and fastening it to seal a corresponding opening of a wall of a tub, consist of:

an opening of circular cross section which defines a cylindrical surface of contact in said wall, said cylindrical surface having a diameter, a collar making an integral part with the outer surface of the casing and being provided with an outer cylindrical surface having a diameter slightly greater than the one of the cylindrical surface of the opening, the flange radially extending outwardly from the outer surface of the casing;

a edge of the skirt that is opposite the periphery of the membrane;

the collar being intended to be engaged against the cylindrical surface of the opening provided in the wall until the edge of the skirt is pressed against the portion of the wall surrounding the opening;

wherein the rim is provided with a recess, the protuberance engages the recess and the portion of the edge of the skirt is intended to be pressed by the rim against the portion of wall of the tub surrounding the opening.

* * * * *